(12) United States Patent
Theisen (10) Patent No.: US 12,338,339 B2
(45) Date of Patent: Jun. 24, 2025

(54) POWER TRANSMISSION BELT WITH CONDUCTIVE RUBBER MIXTURE HAVING GRAPHENE

(71) Applicant: ContiTech Deutschland GmbH, Hannover (DE)

(72) Inventor: Miles Theisen, Omaha, NE (US)

(73) Assignee: ContiTech Deutschland GmbH, Hannover (DE)

( * ) Notice: Subject to any disclaimer, the term of this patent is extended or adjusted under 35 U.S.C. 154(b) by 0 days.

(21) Appl. No.: 18/751,993

(22) Filed: Jun. 24, 2024

(65) Prior Publication Data

US 2025/0002692 A1   Jan. 2, 2025

Related U.S. Application Data

(60) Provisional application No. 63/510,470, filed on Jun. 27, 2023.

(51) Int. Cl.
*C08K 13/00* (2006.01)
*C08K 3/04* (2006.01)
(Continued)

(52) U.S. Cl.
CPC ............... *C08K 13/00* (2013.01); *F16G 1/10* (2013.01); *C08K 3/04* (2013.01); *C08K 3/042* (2017.05); *C08K 2003/265* (2013.01); *C08K 11/00* (2013.01); *C08K 2201/001* (2013.01); *C08K 2201/005* (2013.01); *C08K 2201/006* (2013.01); *F16G 1/28* (2013.01); *F16G 5/08* (2013.01); *F16G 5/20* (2013.01)

(58) Field of Classification Search
CPC .......... C08K 3/04; C08K 3/042; C08K 11/00; C08K 13/00; C08K 2201/001; C08K 2201/005; C08K 2201/006; C08K 2003/265; C08K 3/22; C08K 5/14; F16G 1/10; F16G 1/28; F16G 5/08; F16G 5/20
USPC .................................................. 474/263, 265
See application file for complete search history.

(56) References Cited

U.S. PATENT DOCUMENTS 7,655,729 B2 *   2/2010   Burrowes ............... C08L 23/16
                                                                474/271
9,574,069 B2 *   2/2017   Jasiunas .................. C08L 91/00
(Continued)

FOREIGN PATENT DOCUMENTS

CN         106046436 A     10/2016
EP           2105460 A1      9/2009
(Continued)

*Primary Examiner* — Henry Y Liu
(74) *Attorney, Agent, or Firm* — Richard A. Wolf; Gregory Adams (57) ABSTRACT

A power transmission belt having a conductive rubber mixture, which has a resistivity of less than 6.0 MΩ, wherein the conductive composition includes a base rubber, 25 to 250 phr of non-conductive carbon black as a filler and up to 5 phr of graphene as a conductive filler. The incorporation of a combination of a non-conductive carbon black filler and graphene into the rubber mixture allows for the replacement of conductive carbon black, which is conventionally used to procure conductive properties to rubber, but which has the disadvantage that it is comparatively expensive, especially in the quantities needed to confer conductive properties to the rubber mixture.

12 Claims, 2 Drawing Sheets

(51) Int. Cl.
*C08K 3/26* (2006.01)
*C08K 11/00* (2006.01)
*F16G 1/10* (2006.01)
*F16G 1/28* (2006.01)
*F16G 5/08* (2006.01)
*F16G 5/20* (2006.01)

(56) References Cited

U.S. PATENT DOCUMENTS

| | | | | |
|---|---|---|---|---|
| 9,598,564 | B2* | 3/2017 | Jasiunas | B60C 9/02 |
| 9,856,368 | B2* | 1/2018 | Herzog | C08L 9/06 |
| 10,227,421 | B2* | 3/2019 | Jasiunas | C08C 19/08 |
| 11,142,594 | B2* | 10/2021 | Anderson | C08L 9/06 |
| 11,236,217 | B2* | 2/2022 | Arigo | B60C 11/0008 |
| 11,262,338 | B2* | 3/2022 | Arigo | C09J 191/00 |
| 11,668,685 | B2* | 6/2023 | Arigo | C09J 191/00 |
| | | | | 525/333.7 |
| 2013/0150516 | A1* | 6/2013 | Lettow | C08K 3/36 |
| | | | | 524/495 |
| 2013/0296479 | A1* | 11/2013 | Martin | B82Y 30/00 |
| | | | | 524/575.5 |
| 2015/0315363 | A1* | 11/2015 | Jasiunas | C08L 9/06 |
| | | | | 523/156 |
| 2016/0122515 | A1* | 5/2016 | Karampelas | C08L 5/14 |
| | | | | 106/204.3 |
| 2016/0152805 | A1* | 6/2016 | Jasiunas | B60C 1/0016 |
| | | | | 523/156 |
| 2016/0194485 | A1* | 7/2016 | Herzog | B60C 13/00 |
| | | | | 152/450 |
| 2016/0200141 | A1* | 7/2016 | Herzog | C08K 3/04 |
| | | | | 523/156 |
| 2017/0114155 | A1* | 4/2017 | Jasiunas | C08C 19/22 |
| 2018/0284085 | A1* | 10/2018 | Arigo | G01N 25/4866 |
| 2018/0291125 | A1* | 10/2018 | Anderson | C09J 131/04 |
| 2018/0291181 | A1* | 10/2018 | Anderson | C08L 9/06 |
| 2018/0327569 | A1* | 11/2018 | Karampelas | C08L 1/04 |
| 2020/0056018 | A1* | 2/2020 | Arigo | C09J 11/04 |
| 2020/0109222 | A1* | 4/2020 | Anderson | C08F 8/14 |
| 2020/0325309 | A1* | 10/2020 | Arigo | C08L 9/00 |
| 2020/0371075 | A1* | 11/2020 | Arigo | C09J 7/381 |
| 2022/0283133 | A1* | 9/2022 | Arigo | C09J 7/381 |
| 2023/0084386 | A1* | 3/2023 | Karampelas | C08L 1/04 |
| | | | | 106/204.3 |
| 2025/0043112 | A1* | 2/2025 | Karampelas | C08L 1/04 |

FOREIGN PATENT DOCUMENTS

| EP | 3129673 | A1 | 2/2017 |
|---|---|---|---|
| EP | 3334781 | A1 | 6/2018 |

* cited by examiner

POWER TRANSMISSION BELT WITH CONDUCTIVE RUBBER MIXTURE HAVING GRAPHENE

CROSS-REFERENCE TO RELATED APPLICATIONS

This application claims priority to U.S. Provisional Application No. 63/510,470 filed Jun. 27, 2023, which is incorporated herein by reference in its entirety.

TECHNICAL FIELD

The present disclosure relates to a power transmission belt with a conductive rubber mixture, which has a resistivity according to ASTM D991-89(2020) of less than 6.0 MΩ, wherein the composition comprises a base rubber, 25 to 250 phr non-conductive carbon black as a filler, and up to 5 phr of graphene as a conductive filler. The present disclosure further concerns such conductive rubber mixture and methods for the production of corresponding rubber mixtures, and articles of manufacture, which comprise respective rubber mixtures.

BACKGROUND

Rubber components with electrically conductive properties are conventionally used in applications, where the build-up of higher static charges, which can lead to ignition, is to be avoided, such as in parts used in vicinity of or in motors of motor vehicles. Another application, where static build-up of charges is a problem is where larger rubber parts are rubbed against other parts of a larger constructions, as over time high charge differences may thus be build up, which can represent a danger to workers.

To provide rubber components with electrically conductive properties it is conventional to incorporate electrically conductive materials therein. Such material can e.g. be an extended member or metal such as a metal strip wire, which has the downside however, that electrical conductivity is only conductive along the length of the conductive member. In addition, such member usually is processed in a separate step.

To alleviate these problems, the incorporation of electrically conductive fillers has been suggested to supply rubber mixtures with sufficient electrical conductivity. Such fillers include e.g., metal chips or powder, as well as conductive carbon black.

SUMMARY

An obvious source for the production of conductive carbon black is fossil fuels such as crude oil, from which the carbon black is produced by partial oxidation. Regularly, the carbon black is an unwanted by-product, which can be washed from the exhaust gases when the respective fuel is burned. In the coming years, it is expected however that more and more fossil fuel driven processes will be replaced by electric power-driven processes or by carbon-free replacements such as hydrogen, where no carbon black is produced.

This will have a significant impact on the availability and cost of carbon black as a raw material. If more and more countries adopt the goal of carbon neutrality, processes, which are dependent on the burning of fossil fuels, will have to be phased out. Whereas for non-conductive carbon black, which is extensively used in tires as a filler material, processed for the regeneration or recovery of carbon black have been described, no such processes are yet available for the production of conductive carbon black. Accordingly, the transition to a carbon free economy will strongly affect the price and availability of conductive carbon black.

A further disadvantage, which even applies today, is that conductive carbon black is much more expensive than regular non-conductive carbon black. Given that to provide an article with the desired electrical conductivity it is conventional to incorporate a relevant quantity of conductive carbon black, this makes the cost of this constituent a relevant price factor in conductive articles.

Given these circumstances, there is a need to provide rubber articles with electrical conductivity, which avoids the necessity to incorporate larger amounts of conductive carbon black. Preferably, the replacement for this material should be less costly and/or be more effective to provide the required conductivity, which allows to use the same conductive additive at lower quantities or overall cost.

According to an aspect of the present disclosure, it has unexpectedly been discovered that conductive carbon black can be replaced with a mixture of regular (non-conductive) carbon black and a minor quantity of graphene to provide essentially the same electrical conductivity properties. The quantity of graphene, which is used to provide comparable electrical conductivity to conductive carbon black, is so low that it outweighs the potential disadvantage of a higher price of graphene. The large amount of conductive carbon black, which is used in conventional products, can be replaced with conventional carbon black, where the mixture with graphene and absence of the conductive carbon black does not lead to relevant deviations in the properties of the product prepared with a mixture relative to a product, which is prepared with conductive carbon back.

Also, that only very low amounts of graphene are used to impart an article with the required electrically conductive properties suggests that these properties may result from the combination of regular carbon black and graphene.

Accordingly, an aspect of the present disclosure is directed at a conductive rubber mixture, which has a resistivity according to ASTM D991-89(2020) of less than 6.0 MΩ, wherein the composition comprises a base rubber, 25 to 250 phr carbon black as a filler and up to 5 phr of graphene as a conductive filler. Such a conductive rubber mixture with graphene may have comparable physical properties, such as elongation and tensile strength, as a corresponding rubber mixture with conductive carbon black instead, even when the amount of graphene used is about ten times less than the amount of conductive carbon black in the corresponding mixture.

More particularly, according to an aspect, a power transmission belt includes an elastomeric body having an inner section, an outer section, and a load carrying section between the inner and outer sections, at least the inner section being formed from a conductive rubber mixture comprising: at least one base rubber selected from one or more of ethylene-propylene-diene rubber, acrylonitrile-butadiene rubber, hydrogenated acrylonitrile-butadiene rubber, natural rubber, and/or styrene butadiene rubber; 25 phr to 100 phr of non-conductive carbon black as a filler, the non-conductive carbon black having a BET surface area of 130 $m^2$/g or less according to ISO 977:2022; up to 5 phr of graphene as a conductive filler; 10 phr to 50 phr of graphite; 2 phr to 30 phr of fiber filler; and a vulcanizing agent; wherein the conductive rubber mixture has a resistivity according to ASTM D991-89(2020) of less than 2 MΩ, and wherein the conductive rubber mixture has an elongation at break of less than 201%.

Here, the resistivity is a measure for the ability of the material to conduct and dissipate electrical charges. The lower the resistivity, the more electrical conductive is the material. Regular rubber polymers (without filler) have a resistivity of more than 6.0 MΩ, and particular examples according to the present disclosure have resistivities of less than 2 MΩ, for example.

BRIEF DESCRIPTION OF THE DRAWINGS

The annexed drawings, which are not necessarily to scale, show various embodiments according to the present disclosure.

DETAILED DESCRIPTION

The principles and aspects according to the present disclosure have particular application to power transmission belts, and thus will be described herein mainly in this context. It is understood, however, that the principles and aspects of the present disclosure may be applicable to other types of belts for other applications, or to other elastomeric articles in general, when desirable to provide one or more advantages of the material(s) and/or construction(s) described herein.

An aspect of the present disclosure provides a conductive rubber mixture, which has a resistivity according to ASTM D991-89(2020) of less than 6.0 MΩ, wherein the composition comprises a base rubber, 25 to 250 phr carbon black as a filler and up to 5 phr of graphene as a conductive filler, wherein the conductive rubber mixture has a resistivity according to ASTM D991-89(2020) of less than 6 MΩ, more particularly less than 2 MΩ. The conductive rubber mixture may be incorporated into a power transmission belt, and more particularly may form at least an inner section of a power transmission belt to reduce static buildup on the belt inner section.

Generally, the regular "non-conductive" carbon black, which is used as a filler, at least in the content in which it is incorporated into the rubber mixture, under regular circumstances will not provide the required resistivity of less than 6.0 MΩ on its own. Accordingly, the carbon black which is used as a filler is regular/non-conductive carbon black. This carbon black is preferably characterized in that it has a BET surface area of 130 m$^2$/g or less (as determined by ISO 977:2022) and oil absorption number of 150 or less (as determined by ISO 4656:2012. A exemplary carbon black for use as a filler has a BET surface area of between 100 and 127 m$^2$/g and an oil absorption number of between 100 and 130.

As noted above, the content of carbon black in the exemplary conductive rubber mixture is 25 to 250 phr. In most cases, however the content of the filler will be on the lower end of this range, such as in the range of 25 to 100 phr and more preferably 30 to 60 phr.

It is also noteworthy, that it is not harmful to the exemplary conductive rubber mixture, if it contains conductive carbon black, although aspects of this disclosure target the replacement of this ingredient due to the reasons as given above. Therefore, it may be preferred, that if the conductive rubber mixture contains conductive carbon black the amount of this ingredient should be very limited such as preferably at most 10 phr, more preferably at most 5 phr and even more preferably at most 2 phr. In a particularly preferred embodiment, the exemplary conductive rubber mixture does not contain conductive carbon black (i.e. no conductive carbon black is added for the formulations of the conductive rubber mixture). Conductive carbon black is Carbon black, which has a BET surface area of more than 130 m$^2$/g and preferably more than 150 (as determined by ISO 977:2022) and oil absorption number of more than 150 and preferably more than 170 (as determined by ISO 4656:2012).

An exemplary graphene for use in the rubber mixtures of the present disclosure may be a graphene with a particle size of between about 100 nm to 5 μm, preferably with a specific surface area of <200 m$^2$/g and more preferably <180 m$^2$/g (DLS/PSA estimate) and/or a dry powder resistivity of <200 Ωcm, preferably <150 Ωcm and more preferably <100 Ωcm.

Since the electrical conductivity properties in the exemplary rubber mixture are mainly provided by the graphene in the mixture, then the rubber itself, which is used in the mixture, is not subject to any relevant restrictions. Accordingly, the rubber can be any rubber or mixture of rubbers, which are used in conventional rubber products. From the aspect of potential hazards, which may arise when the rubber is exposed to flames of fire, it is preferred however, that the rubber in the rubber mixture is a non-halogenated rubber.

Particularly suitable rubbers for use in this exemplary rubber mixture include e.g., ethylene-propylene-diene rubber, ethylene-propylene rubber, acrylonitrile or acrylonitrile-butadiene rubber, hydrogenated acrylonitrile-butadiene rubber, natural rubber, synthetic polyisoprene rubber, styrene butadiene rubber, polybutadiene rubber, ethylene propylene rubber, ethylene acrylate rubber (AEM) and acrylate rubber (ACM), or suitable mixtures thereof, wherein preferably the base rubber is ethylene-propylene-diene rubber.

An ethylene-propylene-diene rubber having an ethylene content in the range of 45 to 75% by weight and particularly 45 to 55% by weight is preferred as the EPDM. The diene content here is expediently in the range from 0.1 to 12% by weight, preferably in the range from 2 to 10% by weight and particularly preferably in the range from 3 to 9% by weight. Any dienes used in EPDM can be used here as dienes, with cyclopentadiene, ethylidene norbornene and 1,4-hexadiene being able to be specified as preferred dienes. In a particularly preferred embodiment, the rubber is a mixture of a first ethylene-propylene-diene rubber with a diene content of 4 to 5 wt.-% and an ethylene to propylene ratio of from 50:50 to 65:35 and a second ethylene-propylene-diene rubber with diene content of 4 to 5 wt.-% and an ethylene to propylene ratio of form 65:35 to 80:20; in this case, the respective rubbers necessarily have a different composition.

For consolidation of the rubber, the conductive rubber mixture is preferable processed by vulcanisation, whereby the rubber is crosslinked to a permanently fixed form. The crosslinking or vulcanization can be affected by any crosslinking or vulcanization treatment which is known in the art, and the selection of a suitable crosslinking and vulcanization agent is within the regular abilities of the skilled practitioner.

Vulcanizing agents for use in the exemplary conductive rubber mixture include for example sulfur vulcanizing agent or peroxide vulcanizing agents. Suitable peroxide vulcanizing agents include i.a. dicumyl peroxide, di-t-butyl peroxide, t-butyl cumyl peroxide, 2,5-dimethyl-2,5-bis(t-butylperoxy) hexane, 2,5-dimethyl-2,5-bis(t-butylperoxy)-hexyne-(3), α,α'-bis(t-butylperoxy)-diisopropylbenzene, di-t-amyl peroxide, 1,3,5-tris(2-t-butylperoxy-isopropyl)benzene, 1-phenyl-1-t-butylperoxyphthalide. Suitable ketal peroxides include 1,1-bis(t-butylperoxy)-3,3,5-trimethylcyclohexane, 1,1-bis(t-butylperoxy)cyclohexane, 2,2'-bis(t-butylperoxy)-butane, ethyl 3,3-bis(t-butylperoxy)butyrate, n-butyl 4,4-bis (t-butylperoxy)valerate, from which dicumyl peroxide α,α'-bis(t-butylperoxy) diisopropylbenzene, t-butyl cumyl peroxide, 2,5-dimethyl-2,5-bis(t-butylperoxy) hexyne-3, and 2,5-dimethyl-2,5-bis(t-butylperoxy)hexane are particularly preferred.

Suitable sulfur vulcanizing agents include sulfur (e.g. in the form of ground sulfur) or a sulfur-containing crosslinking agent such as bis[3-(triethoxysilyl)propyl]-polysulfide or a mixture thereof.

The vulcanizing agent is used in a quantity, which is effective to provide the desired degree of vulcanization, the determination of which is within the regular abilities of the skilled practitioner. Preferably, however, the amount of vulcanizing agent is adjusted in a range of form 0.05 to 5 wt.-% and preferably between 0.1 and 3 wt.-%, relative to the total weight of the conductive rubber mixture.

Next to the vulcanizing agent, to increase the crosslinking efficiency, the exemplary conductive rubber mixture can also comprise a vulcanizing co-agent, which is a compound having one or more, preferably more than one, unsaturated carbon-carbon bond. Suitable vulcanizing coagent include for example triallyl isocyanurate, triallyl cyanurate, triallyl trimellitate, trimethylolpropane triacrylate, and trimethylolpropane trimethacrylate, but also metal acrylates or methacrylates such as zinc diacrylate and zinc dimethacrylates. If such vulcanizing co-agent is used, it may be included into the conductive rubber composition in a quantity, which is higher than the amount of vulcanizing agent such as from 2 to 15 wt.-% and preferably from 5 to 12 wt.-%. Relative to the rubber in the conductive rubber mixture, the preferred vulcanizing co-agent content is from 10 to 30 phr and preferably from 15 to 25 phr.

A further type of additive, which can influence the vulcanization are cure accelerators, are compounds which specifically accelerate sulfur cure or peroxide cure. Commonly used accelerators for sulfur vulcanisation are, for example, sulfenamides, e.g. N-cyclohexyl-2-benzothiazylsulfenamide (CBS), thiazoles, e.g. 2-mercaptobenzothiazole (MBT), dithiocarbamates, e.g. zinc dibenzyldithiocarbamate (ZBEC) or zinc dibutyldithiocarbamate (ZDBC), guanidines, e.g. diphenylguanidine (DPG) or thiophosphates. Examples of suitable sulfur donors, which can be added to control sulfur crosslinking, are thiurams such as tetramethylthiuram disulphide (TMDT) or tetramethythiurammonsulphide (TMTM), caprolactam disulphide or phosphoryl polysulphide. Such accelerators and sulfur donors may suitably be included in the exemplary elastomer composition at a total level of from 1 to 5 phr.

Antioxidants such as 2,2,4-trimethyl-1,2-dihydroquinoline (TMQ) or 1,3-dihydro-4(or 5)-methyl-2H-benzimidazole-2-thione can be used to support the peroxide crosslinking. Such antioxidants and sulfur donors can be present in the elastomer composition in a total amount of 1 to 5 phr.

Besides non-conductive carbon black, the exemplary conductive rubber mixture may comprise one or more further fillers, which are other than non-conductive carbon black. Such fillers included in particular calcium carbonate, talc, clay, hydrated silica, graphite and fibers. Fiber fillers include polymer fiber, glass fibers and fibers on the basis of biopolymers such as e.g. cotton fibers. If fiber are included into the exemplary conductive rubber mixture, they are advantageously used in a content of 2 to 30 phr, preferably 5 to 25 phr and more preferably 8 to 20 phr. If the exemplary conductive rubber mixture comprises graphite, the graphite is preferably included in a content of 10 to 50 phr and more preferably in a content of 15 to 30 phr. In the above, graphite and carbon black are to some extent electro-conductive, but are used in the exemplary compositions of this disclosure in contents, where by use of these compounds only, the required resistivity is not achieved. These ingredients can still be incorporated into the exemplary conductive rubber mixture to provide other functionality, such as improved wear resistance when used e.g. in belts.

The total content of fillers in the exemplary conductive rubber mixture is not subject to relevant restrictions, but the content of filler should not be so high that the elastic properties are affected in an unfavorable manner. Suitable total filler contents are in the range of 10 to 300 phr, where a content of 20 to 150 is more preferred and a content of 25 to 100 phr is even more preferred.

In addition, the exemplary conductive rubber mixture may comprise a flame retardant such as a dehydrating flame retardant e.g. in the form of a metal hydroxide. Suitable flame retardants for incorporation into the exemplary conductive rubber mixture include i.a. magnesium hydroxide (MDH), aluminum hydroxide (ATH), antimony trioxide, nanoclays and/or zinc borate, preferably as a synergistic mixture of two or more of them. In particular, the flame retardant(s) is/are solid and powdery or crystalline. The flame retardant can be replaced for part of the filler, in which case the total content of filler and flame retardant should be in the rages as noted above.

In addition to the ingredients discussed above, the exemplary conductive rubber mixture may also comprise any of conventional additives, which are found in and formulated into rubber compositions. Such additive included i.a. process and extender oils, antioxidants, waxes, pigments, anti-aging agents, antioxidants and anti-ozonants. The content of these additives is regularly limited such that the intended effect is achieved, so that in most cases the total content of these additives will be in the range of from 0.5 to 15 phr and preferably 1 to 10 phr.

As noted above, the exemplary conductive rubber mixture has a resistivity according to ASTM D991-89(2020) of less than 6 MΩ; herein, the resistivity is usually determined for a cured or vulcanized test specimen. It is preferred in this regard, that the conductive rubber mixture has a resistivity of less than 5 MΩ, more preferably less than 4 MΩ, even more preferably less than 3 MΩ, and even more preferably less than 2 MΩ. It is especially preferred, that the exemplary conductive rubber mixture has a resistivity in the range of from 0.05 to 1 MΩ and in particular in the range from 0.08 to 0.5 MΩ.

The exemplary conductive rubber mixture can be prepared by any known method and apparatus, by which rubber mixtures are prepared in the art. Accordingly, in a second aspect, the present disclosure is directed to a method for the preparation of a conductive rubber mixture as described above, wherein the base rubber, carbon black and graphene are mixed and compounded to provide an intimate mixture. Such mixing can be performed in any conventional equipment such as a mixer, extruder or mill, where as a product the conductive rubber mixture is provided.

As noted above, conductivity and elastic properties are desired in many applications where elastic properties are needed and where static charges are to be avoided to cope with ignition/spark risks. Accordingly, in a further aspect, the present disclosure concerns an article of manufacture, which comprises a vulcanized conductive rubber mixture as described above. From a perspective of risks of spark ignition/explosion, articles, which are used in agriculture or vehicle motors or for conducting flammable substances, e.g. hoses, belts or engine mounts, are a preferred embodiment of such articles.

Hoses in engines, which comprise the exemplary conductive rubber mixture, can e.g. be fuel hoses or hoses for brake fluid. Belts likewise can have any shapes and dimensions which are found in vehicles including, but not limited to, endless belts and preferably belts selected form the group consisting of a multi-v-ribbed belt, a v-belt, a toothed synchronous belt and a flat belt.

In a belt or hose, the conductive rubber mixture may form a core, or an inner and/or outer layer of the belt or hose.

Another application, where the exemplary conductive rubber mixture is of utility, is a conveyor belt. Accordingly, in a preferred embodiment of this aspect, the article of manufacture is a conveyor belt comprising the conductive rubber mixture as described above. Preferably, in such conveyor belt the exemplary conductive rubber mixture is provided as a coating on at least the surface of the conveyor belt to thus dissipate static charges.

By means of the replacement of conductive carbon black by a combination of non-conductive carbon black and graphene, it is possible to significantly reduce the content of expensive and fossil fuel derived/non-renewable materials in respective compositions. Thus, the exemplary rubber mixture allows for a significant reduction of the $CO_2$ footprint of the final product, and also may provide a cost benefit when larger quantities of conductive carbon black can be replaced by much cheaper non-conductive carbon black.

The exemplary rubber composition may have properties that make it particularly suitable for belt applications, such as power transmission belts, or the like. Accordingly, in exemplary embodiments, the material properties of the exemplary conductive rubber mixture may include one or more original properties of: (i) elongation at break of greater than about 70%, more particularly greater than 100%, such as in a range from about 70% to about 300%, or less than about 200% such as from 70% to 200%; (ii) tensile strength of greater than 500 psi, more particularly greater than about 1,250 psi, such as from about 1,000 psi to about 4,000 psi; (iii) Shore A hardness in a range from about 70 to 90.

The tensile, elongation, and modulus evaluations may be determined by ASTM-D412 at ~25° C. The Shore A hardness evaluation may be determined by ASTM-D2240 at ~25° C. Because of the dispersed fiber content, such values may be "with" the processing direction—i.e., in the direction of fiber, it being understood that such materials may be anisotropic with respect to some properties.

Certain embodiments of the disclosure will hereafter be described with reference to the accompanying drawings, in which like reference numerals denote like elements. It should be understood, however, that the accompanying figures illustrate the various implementations described herein and are not meant to limit the scope of various technologies described herein. In addition, it is understood that various aspects and features of these embodiments may be substituted for one another or used in conjunction with one another where applicable. Furthermore, it is understood that the description of material(s) forming the various parts of one embodiment article may be the same material(s) for the same or similar part in another embodiment article, except as otherwise noted below.

Figure 1:
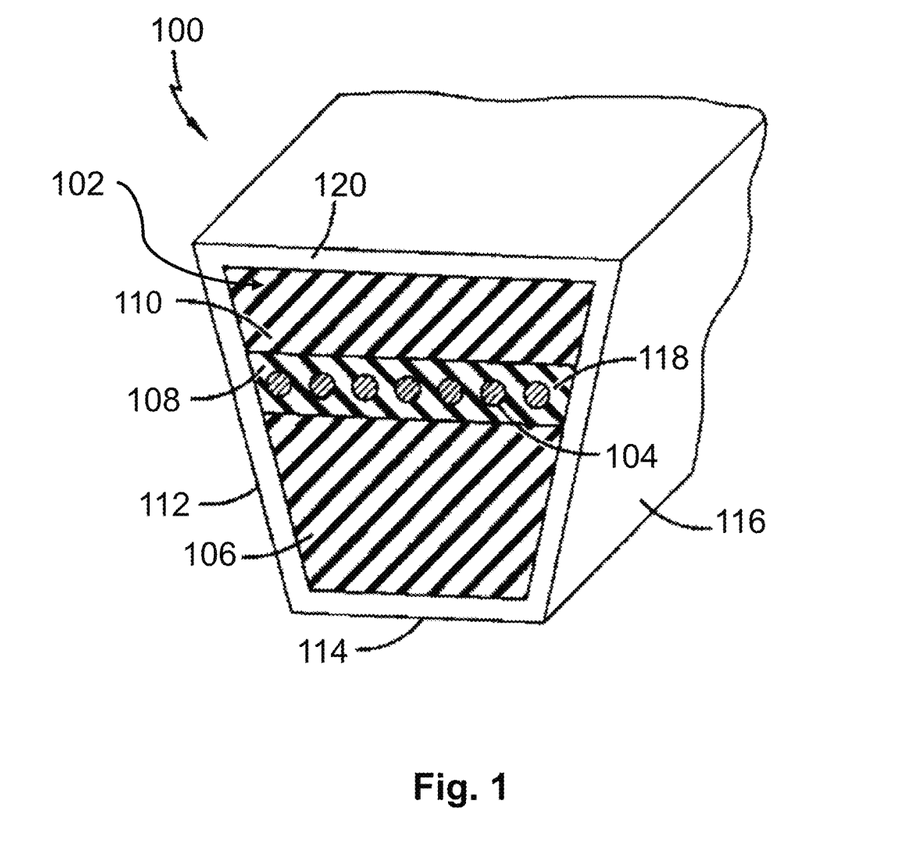
FIG. 1 illustrates a portion of an endless belt in a perspective sectional view, in accordance with an embodiment of the present disclosure.

Referring to FIG. 1, a power transmission belt 100 is shown in the form of an endless V-belt. The belt 100 includes an elastomeric body 102 having reinforcement cords 104 embedded therein. The elastomeric body 102 includes an inner engagement section 106, an outer section 108, and a load carrying 110 section between the inner section 106 and the outer section 108. The belt 100 is configured to engage with a pulley/sheave and includes at least one drive surface. In the illustrated belt, there are three drive surfaces 112, 114, 116 that are configured to engage within the groove of the pulley/sheave.

The load carrying section 110 includes a reinforcement, such as reinforcement cords 104 (also referred to as tensile cords), and provides a majority of the tensile strength to the belt. The reinforcement cords 104 may be embedded in an elastomeric cushion or matrix 118 portion of the elastomeric body 102. The reinforcement cords 104 extend generally in the longitudinal direction of the belt. The load carrying section 110 may include one or more plies of such tensile cords 104.

The reinforcement cords 104 may be made of any suitable material or combination of materials and may have any suitable form as may be desired for the particular application. For example, the cords may be formed form yarns having a particular denier and twist. The ply twist may be greater than the yarn twist, and the cord twist may be less than with the yarn or the ply twist. Yarn twist refers to the spiral or helical arrangement of fibers or filaments within a single strand of yarn. Cord twist refers to the twist applied to multiple yarns or strands when they are twisted together to create a thicker, stronger cord. Ply twist is the twist applied to the individual strands or plies before they are twisted together to create a cord or rope. Higher twist values may provide a slightly better flex fatigue to the belt but may reduce the belt modulus. Conversely, lower twist values may increase the belt modulus, but reduce flex fatigue. The yarns and plies may be twisted in the same direction, while the cord may have an opposing twist direction. As such, the cord twists may be either ZZS or SSZ. S-twist refers to the fibers, yarns, or strands are twisted together in a counterclockwise direction. In Z-twist, the fibers, yarns, or strands are twisted together in a clockwise direction.

The material(s) forming the cord may include synthetic, inorganic or natural material. For example, synthetic materials, such as synthetic polymers, may include for example acrylonitrile, polyacrylonitrile, polypropylene, polyester in particular polyethylene terephthalate (PET) or polyethylene 2,6-naphthalate (PEN), polyamide, polyimide, polyurethane, polyphenylene sulfide, polyoxadiazole, aramids, such as p-aramid, m-aramid or copoly-para-aramid, polyimide, polyetherimide, polyetheretherketone, polyethylene 2,6-naphthalate, polyphenylene, polyphenylene oxide, polyphenylene sulfide, polyphenylene ether, polybenzoxazoles, polysulfone, polyvinyl acetal, polyvinyl alcohol. The natural materials may include rockwool or asbestos, cotton, flax or hemp, or wool or silk. Inorganic materials may include glass, ceramic, carbon, metal, for example steel, or mineral, for example basalt. Hybrid designs, for example in the form of a mixed yarn can also be used.

The outer section 110 (also referred to as the cover, backing or spine section) overlies at least the load carrying section 108 and provides protection to the load carrying section 108 having the reinforcement cords. The inner engagement section 106 underlies the load carrying section 108 and experiences compressive load from the pulleys/ sheaves or other component of the power transmission system. As such, the inner engagement section 108 is also referred to as a compression section, or cushion section, and distributes load to the reinforcement cords 104. As shown, the inner (cushion) section 106 may constitute a majority of the volume of the belt. The elastomeric body 102 may have a generally trapezoidal shape and the elastomeric nature of the inner engagement section 106 can provide for firm lateral pressure against the sheave/pulley sidewall.

The rubber compounds forming the inner (cushion) section 106, the load carrying section (108) (e.g., matrix 118), and the outer section (110) may be the same or different. Generally, if different rubber compounds are used for one or more of the sections, they are based on the same polymer or polymer blends as each other, although such different rubber compounds may have different proportions of such polymers, and may have different proportions of additives. Generally, it may be preferred to have the conductive rubber mixture form at least the inner section 106 of the power transmission belt as this is where static charge can build up.

As shown, the belt 100 may be provided with one or more fabric layers 120 on one or more sides. In the illustrated embodiment, the belt 100 is wrapped with the fabric layer 120 on all sides. In other embodiments, the fabric reinforcement layer 120 may be at least partially embedded in the cross-linked elastomeric body 102, which may give rise to both the elastomeric body and fabric reinforcement forming an outer surface of the belt. Generally, the fabric reinforcement layer 120 may be provided at least on the drive surface(s) 112, 114, 116 to enhance the mechanical stability of these surfaces and may provide a wear resistant surface to engage pulleys. Alternatively, the belt 100 may be provided without a fabric layer 120 on one or more sides and is referred to as a raw edge belt.

The fabric layer 120 may have any suitable construction, including a bi-directional, non-woven, woven, knitted, or braided fabric. The fabric may include warp and weft threads laid at any desired angle. The fabric layer 120 may be a plated knitted fabric including courses of yarn knitted together. In some embodiments, more than one ply of fabric may be employed. If desired, the fabric may be cut on a bias so that the strands form an angle with the longitudinal direction of travel of the belt 100. The angle may be of any suitable angle, for example, but not limited to 0 or 90 degrees, or any point along the continuum there between.

The fabrics for use in the fabric layer 120 may be formed from any suitable material or combination of materials. For example, the fabrics for use in the fabric layer 120 may be formed from materials including nylon (such as nylon 4,6, nylon 6, 6, and nylon 6), cotton, polyester, cotton/polyester, nylon/polyester, cotton/nylon, aramid, rayon, or the like. Hybrid designs, for example in the form of a mixed fabrics, can also be used.

The fabric in the fabric layer 120 may be coated with an elastomeric material. In some embodiments, the fabric layer may have a different coating on one side to assure that the fabric layer 120 is bonded to the belt section(s) 106, 108, 110 to which it is applied; and may have a different coating on the opposite side to provide low friction and/or abrasion resistance. In some embodiments, the exemplary conductive rubber mixture according to the present disclosure may be used to coat the fabric layer 120.

As shown in the illustrated embodiment, the drive surfaces 112, 114, 116 may be smooth. However, the inner engagement section 106 of the belt may include longitudinal or transverse grooves or ribs that engage corresponding pulley/sheave grooves in the power transmission system. The outer engagement section 110 also may have grooves or teeth, forming a dual sided belting. The grooves or teeth may be provided as single V-grooved, multi-V-grooved or synchronous in which an inner toothed surface that engages with tooth spaces on the periphery of a mating sprocket.

Figure 2:
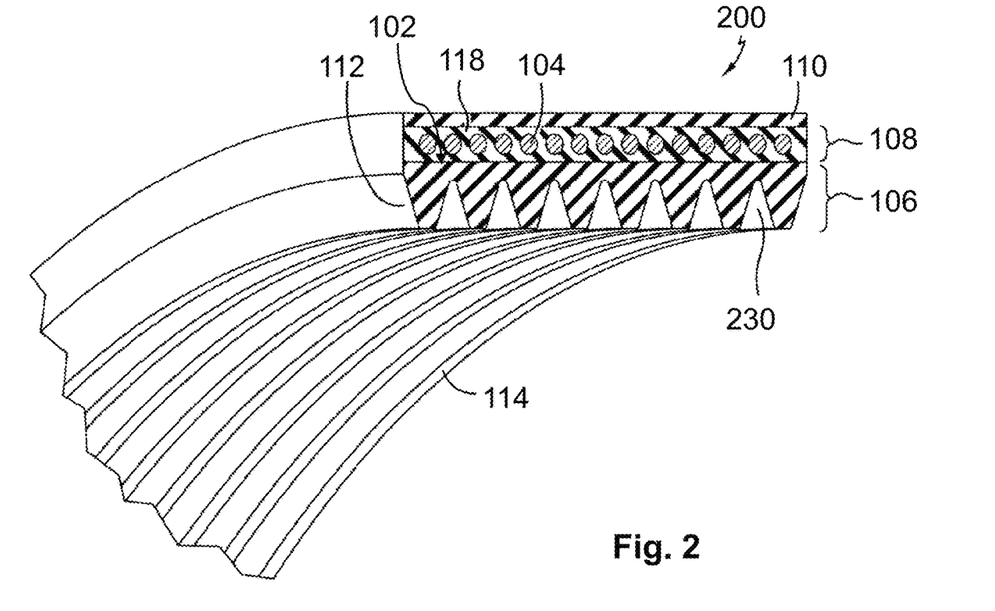
FIG. 2 illustrates a portion of another endless belt in a perspective sectional view, in accordance with an embodiment of the present disclosure.

Turning to FIG. 2, another exemplary embodiment of an endless power transmission belt 200 is shown, which in this embodiment is in the form of a grooved V-belt. The belt 200 includes an elastomeric body 120 having inner (cushion) section 106, load carrying section 108, and outer section 110. The load carrying section includes cords 104 embedded in matrix 118. The inner (cushion) section 106 has a plurality of longitudinal ribs with a plurality of longitudinal grooves 230. The ribs and grooves form drive surfaces 112, 114.

Figure 3:
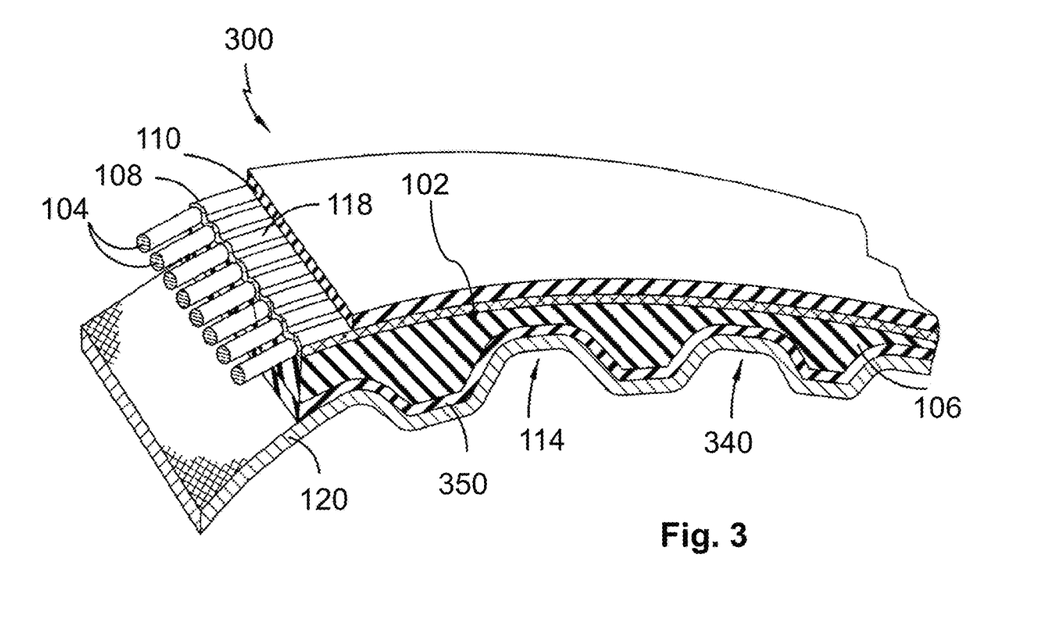
FIG. 3 illustrates a portion of another endless belt in a perspective sectional view, in accordance with an embodiment of the present disclosure.

FIG. 3 illustrates another exemplary embodiment of an endless power transmission belt 10, which is in the form of a timing belt. The belt 300 includes an elastomeric body 120 having inner (cushion) section 106, load carrying section 108, and outer section 110. The load carrying section includes cords 104 embedded in matrix 118. The inner (cushion) section 106 has transverse grooves 340. The belt 300 has fabric layer 120 adhered below the elastomeric inner cushion section 106 to form drive surface 114. The belt 300 may have an insulation layer 350 located between the inner (cushion) section 106 and the fabric layer 120 to prevent or decrease rubber from the inner (cushion) section 106 from permeating through the fabric 120 to the drive surface 114.

Embodiment(s) of the exemplary rubber compound may form one or more of the inner section 106, the load carrying section (e.g., matrix 118), and/or the outer section 110 of the belt(s) 100, 200, 300. Other sections may be made of different polymers or blends, however, the same base polymer may be used for compatibility with the exemplary rubber compound to form the belt 100, 200, 300. Such different polymer(s) of the different section(s) of the belt may have any of the polymer(s) or additive(s) in the amount(s) described herein.

EXAMPLES

To test the resistivity of rubber mixtures according to the disclosure, formulations with graphene contents of from 1 to 3 phr were prepared. The respective compositions and resistivity of these compositions are given in the following table 1. Therein, the tensile strength and elongation were determined according to ASTM D415 and the Shore was determined according to ASTM D2240-15:

TABLE 1

|  | Comparative example | Example 1 | Example 2 | Example 3 | Example 4 | Example 5 |
|---|---|---|---|---|---|---|
| EPDM-rubber | 100 | 100 | 100 | 100 | 100 | 100 |
| CaCO$_3$ filler | 28 | 28 | 28 | 28 | 28 | 28 |
| standard carbon black | 0 | 32 | 32 | 32 | 32 | 32 |

TABLE 1-continued

|  | Comparative example | Example 1 | Example 2 | Example 3 | Example 4 | Example 5 |
|---|---|---|---|---|---|---|
| Conductive carbon black | 32 | 0 | 0 | 0 | 0 | 0 |
| Graphite | 22 | 22 | 22 | 22 | 22 | 22 |
| Cotton flocks | 16 | 16 | 16 | 16 | 16 | 16 |
| antioxidant | 1 | 1 | 1 | 1 | 1 | 1 |
| anti-aging agent | 1 | 1 | 1 | 1 | 1 | 1 |
| rubber curing accelerator | 0.6 | 0.6 | 0.6 | 0.6 | 0.6 | 0.6 |
| Curing co-agent | 21 | 21 | 21 | 21 | 21 | 21 |
| graphene | 0 | 1.0 | 1.5 | 2.0 | 2.5 | 3.0 |
| Peroxide vulcanizing agent* | 0.015 | 0.015 | 0.015 | 0.015 | 0.015 | 0.015 |
| Tensile strength [psi] | 1321 | 1499 | 1055 | 1377 | 1302 | 1040 |
| Elongation [%] | 152 | 201 | 75 | 132 | 130 | 58 |
| Shore A | 87 | 88 | 88 | 89 | 88 | 88 |
| Resistivity MΩ | 0.12 | 1.43 | 0.26 | 0.51 | 0.19 | 0.12 |

*the weight of the vulcanizing agent is given in relation to the weight of the entire composition; other weights (except for the rubber) are given in phr As is shown in the above table, by replacing the conductive carbon black in the comparative mixture with a combination of regular carbon black and graphene, the same static conductivity can be achieved when about 3 phr of graphene were added, and in almost all cases a high conductivity (less than 1.5 MΩ) can be achieved with the incorporation of the graphene from 1 phr to 3 phr. The physical properties also may be maintained at about the same level as the comparative example. As such, the exemplary composition has a similar resistivity (e.g., within 10-15% or less) and/or elongation (e.g., within 10-15% or less) as compared to the comparative mixture with the same composition but with ten times or more conductive carbon black instead of graphene. For example, Example 4 with 2.5 phr of graphene is similar to comparative example 1 which has about 13 times as much conductive carbon black than graphene; and in which the tensile is similar (within 10-15% or less), the elongation is similar (within 10-15% or less) and the resistivity is similar (within 10-15% or less).

Given that conductive carbon black cannot be recycled in a manner that it maintains its conductivity properties (whereas this is possible for regular carbon black), the amount of conductive material, which has to be newly introduced into the rubber mixture, mixture can thus be significantly reduced or eliminated, such that the composition is devoid of such conductive carbon black.

According to at least one aspect, the techniques described herein relate to a power transmission belt including an elastomeric body having an inner section, an outer section, and a load carrying section between the inner and outer sections, at least the inner section being formed from a conductive rubber mixture including: at least one base rubber selected from one or more of ethylene-propylene-diene rubber, acrylonitrile-butadiene rubber, hydrogenated acrylonitrile-butadiene rubber, natural rubber, and/or styrene butadiene rubber; 25 phr to 100 phr of non-conductive carbon black as a filler, the non-conductive carbon black having a BET surface area of 130 m2/g or less according to ISO 977:2022; up to 5 phr of graphene as a conductive filler, the graphene having a particle size of between 100 nm to 5 μm, and a specific surface area of less than 200 m2/g; 10 phr to 50 phr of graphite; 2 phr to 30 phr of fiber filler; and a vulcanizing agent; wherein the conductive rubber mixture has a resistivity according to ASTM D991-89(2020) of less than 2 MΩ, and wherein the conductive rubber mixture has an elongation at break of less than 201%.

Exemplary embodiments may include one or more of the following additional features, alone or in any suitable combination.

In some embodiments, the techniques described herein relate to a power transmission belt, wherein the conductive rubber mixture has a resistivity according to ASTM D991-89(2020) in the range of from 0.1 to 1.4 MΩ.

In some embodiments, the techniques described herein relate to a power transmission belt, wherein the conductive rubber mixture has an elongation at break in a range from 58% to 201%.

In some embodiments, the techniques described herein relate to a power transmission belt, wherein the content of the non-conductive carbon black is from 30 phr to 60 phr.

In some embodiments, the techniques described herein relate to a power transmission belt, wherein the content of the graphite is from 15 phr to 30 phr.

In some embodiments, the techniques described herein relate to a power transmission belt, wherein the content of the fiber filler is from 5 phr to 25 phr.

In some embodiments, the techniques described herein relate to a power transmission belt, wherein a total filler content is from 20 phr to 150 phr.

In some embodiments, the techniques described herein relate to a power transmission belt, further including calcium carbonate filler.

In some embodiments, the techniques described herein relate to a power transmission belt, wherein the vulcanizing agent is a peroxide.

In some embodiments, the techniques described herein relate to a power transmission belt, wherein the conductive rubber mixture is devoid of conductive carbon black.

In some embodiments, the techniques described herein relate to a power transmission belt wherein the rubber mixture has a resistivity within 10 to 15% or less as compared to a comparative rubber mixture having the same composition but with 10-15% more conductive carbon black than the graphene used in the conductive rubber mixture, and has an elongation within 10 to 15% or less as compared to the comparative rubber mixture.

In some embodiments, the techniques described herein relate to a power transmission belt, wherein the load carrying section includes reinforcement yarns.

According to another aspect, the techniques described herein relate to a power transmission belt including an elastomeric body having an inner section, an outer section, and a load carrying section between the inner and outer sections, at least the inner section being formed from a conductive rubber mixture including: 100 phr of ethylene-propylene-diene rubber; 28 phr of calcium carbonate filler; 25 phr to 60 phr of non-conductive carbon black as a filler, the non-conductive carbon black having a BET surface area of 130 m2/g or less according to ISO 977:2022; no conductive carbon black; 10 phr to 50 phr of graphite; 2 phr to 30 phr of fiber filler; 1 phr to 3 phr of graphene as a conductive filler, the graphene having a particle size of between 100 nm to 5 μm, and a specific surface area of less than 200 m2/g; and a peroxide vulcanizing agent; wherein the conductive rubber mixture has a resistivity according to ASTM D991-89(2020) in a range from 0.1 to 2 MΩ, and wherein the conductive rubber mixture has an elongation at break in a range from 58% to 201%.

Exemplary embodiments may include one or more of the foregoing or following features, alone or in any suitable combination.

According to another aspect, the techniques described herein relate to conductive rubber mixture having a resistivity according to ASTM D991-89(2020) of less than 6.0 MΩ, wherein the composition includes a base rubber, 25 to 250 phr carbon black as a filler and up to 5 phr of graphene as a conductive filler.

Exemplary embodiments may include one or more of the foregoing or following features, alone or in any suitable combination.

In some embodiments, the techniques described herein relate to conductive rubber mixture, wherein the base rubber is non-halogenated rubber, preferably selected from ethylene-propylene-diene rubber, ethylene-propylene rubber, acrylonitrile or acrylonitrile-butadiene rubber, hydrogenated acrylonitrile-butadiene rubber, natural rubber, synthetic polyisoprene rubber, styrene butadiene rubber, polybutadiene rubber, ethylene propylene rubber, ethylene acrylate rubber and acrylate rubber, wherein preferably the base rubber is ethylene-propylene-diene rubber.

In some embodiments, the techniques described herein relate to conductive rubber mixture, wherein the carbon black filler is a non-conductive carbon black, preferably wherein the content of non-conductive carbon black is 25 to 100 phr and more preferably 30 to 60 phr.

In some embodiments, the techniques described herein relate to conductive rubber mixture, further including a vulcanization agent, preferably selected from the group consisting of peroxide vulcanizing agents and sulfur vulcanizing agents, and optionally a vulcanization co-agent.

In some embodiments, the techniques described herein relate to conductive rubber mixture, further including one or more of non-carbon black fillers, preferably including one or more of calcium carbonate, talc, clay, hydrated silica, graphite, fibers, plasticizers, process and extender oils, antioxidants, waxes, pigments, anti-aging agents, antioxidants and anti-ozonants.

In some embodiments, the techniques described herein relate to conductive rubber mixture, wherein the rubber mixture has a resistivity according to ASTM D991-89(2020) of less than 3 MΩ, preferably in the range of from 0.05 to 1 MΩ and more preferably of from 0.08 to 0.5 MΩ.

In some embodiments, the techniques described herein relate to a method for the preparation, wherein the base rubber, carbon black filler and graphene are mixed and compounded, preferably in a mixer, extruder or mill, to provide the conductive rubber mixture.

In some embodiments, the techniques described herein relate to an article having the conductive rubber mixture.

In some embodiments, the techniques described herein relate to a hose or belt for use, wherein the conductive rubber mixture forms a core in the hose or belt, or wherein the hose or belt includes and inner and/or outer layer, which is formed from the conductive rubber mixture.

In some embodiments, the techniques described herein relate to a belt, wherein the belt is an endless belt, preferably selected form the group consisting of a multi-v-ribbed belt, a v-belt, a toothed synchronous belt and a flat belt.

In some embodiments, the techniques described herein relate to a conveyor belt including a conductive rubber mixture, wherein preferably the rubber mixture is provided as a coating on at least the surface of the conveyor belt.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. Thus, while a particular feature may have been described with respect to only one or more of several embodiments, such feature may be combined with one or more other features of the other embodiments, separately or in any combination. The same may also be varied in many ways. Such variations are not to be regarded as a departure from the disclosure, and all such modifications are intended to be included within the scope of the disclosure. as may be desired and advantageous for any given or particular application.

Any background information contained in this disclosure is to facilitate a better understanding of the various aspects described herein. It should be understood that any such background statements are to be read in this light, and not as admissions of prior art. Likewise, the description and examples are presented herein solely for the purpose of illustrating the various embodiments of the disclosure and should not be construed as a limitation to the scope and applicability of the disclosure.

The phrase "and/or" as used in this disclosure should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" as used in this disclosure should be understood as being inclusive and not exclusive. For example, when separating items in a list, "or" or "and/or" shall be interpreted as being inclusive, i.e., the inclusion of at least one, but also including more than one, of a number or list of elements, and, optionally, additional unlisted items. For example, a condition A or B is satisfied by anyone of the following: A is true (or present) and B is false (or not present), A is false (or not present) and B is true (or present), and both A and B are true (or present). Only terms clearly indicating exclusivity should be interpreted as indicating exclusive alternatives (i.e. "one or the other but not both"), such as "either," "only one of," or "exactly one of." In other words, such terms of exclusivity refer to the inclusion of exactly one element of a number or list of elements.

Any references to "one embodiment" or "an embodiment" as used herein is understood to mean that a particular element, feature, structure, or characteristic described in connection with the embodiment is included in at least one embodiment. The appearances of the phrase "in one embodiment" in various places in the specification are not necessarily referring to the same embodiment.

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The word "exemplary" is used herein to mean "serving as an example or illustration." Any aspect or design described herein as "exemplary" is not necessarily to be construed as preferred or advantageous over other aspects or designs. Likewise, the phrases "particularly," "preferably," or the like as used in this disclosure may refer to an element or value that provides advantage(s) in some embodiment(s), however is not intended to limit the scope of the disclosure to those "particular" or "preferable" features.

Transitional language such as "including," "comprising," "having," "containing," "involving," or variations thereof, is intended to be broad and encompass the subject matter listed thereafter, equivalents, and additional subject matter not recited, i.e., to be open-ended and meaning including but not limited to.

It is to be understood that terms such as "top," "bottom," "upper," "lower," "left," "right," "front," "rear," "forward," "rearward," or the like may refer to an arbitrary frame of reference, rather than to the ordinary gravitational frame of reference.

It is to be understood that all values, ranges, ratios or the like as described in this disclosure may be combined in any manner. In addition, it is to be understood that a concentration or amount or value range listed in this disclosure is intended to include any and every concentration or amount or value within the range, including the end points, as if each value within the range has been expressly stated. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that the inventor(s) appreciate and understand that any and all data points within the range are to be considered to have been specified, and that inventor(s) had possession of the entire range and all points within the range.

In addition, each numerical value used in this disclosure should be read once as modified by the term "about" (unless already expressly so modified), and then read again as not so modified unless otherwise indicated in context. The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values. When the term "about" is used in describing a value or an end-point of a range, the disclosure should be understood to include the specific value or end-point referred to.

The term "consisting essentially of" in relation to a composition is to indicate that substantially (e.g., greater than 95 weight % or greater than 99 weight %) of the component(s) present in the composition is the component(s) recited. Therefore, this term does not exclude the presence of minor additives or impurities as would be understood by those having ordinary skill in the art.

Although the invention has been shown and described with respect to a certain embodiment or embodiments, it is apparent that equivalent alterations and modifications will occur to those having ordinary skill in the art upon the reading and understanding this disclosure, and such modifications are intended to be included within the scope of this disclosure as defined in the claims. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure.

The invention claimed is:

1. A power transmission belt comprising an elastomeric body having an inner section, an outer section, and a load carrying section between the inner and outer sections, at least the inner section being formed from a conductive rubber mixture comprising:
   at least one base rubber selected from one or more of ethylene-propylene-diene rubber, acrylonitrile-butadiene rubber, hydrogenated acrylonitrile-butadiene rubber, natural rubber, and/or styrene butadiene rubber;
   25 phr to 100 phr of non-conductive carbon black as a filler, the non-conductive carbon black having a BET surface area of 130 m$^2$/g or less according to ISO 977:2022;
   up to 5 phr of graphene as a conductive filler, the graphene having a particle size of between 100 nm to 5 µm, and a specific surface area of less than 200 m$^2$/g;
   10 phr to 50 phr of graphite;
   2 phr to 30 phr of fiber filler; and
   a vulcanizing agent;
   wherein the conductive rubber mixture has a resistivity according to ASTM D991-89(2020) of less than 2 MΩ, and
   wherein the conductive rubber mixture has an elongation at break of less than 201%.

2. The power transmission belt according to claim 1, wherein the conductive rubber mixture has a resistivity according to ASTM D991-89(2020) in the range of from 0.1 to 1.4 MΩ.

3. The power transmission belt according to claim 2, wherein the conductive rubber mixture has an elongation at break in a range from 58% to 201%.

4. The power transmission belt according to claim 1, wherein the content of the non-conductive carbon black is from 30 phr to 60 phr.

5. The power transmission belt according to claim 1, wherein the content of the graphite is from 15 phr to 30 phr.

6. The power transmission belt according to claim 1, wherein the content of the fiber filler is from 5 phr to 25 phr.

7. The power transmission belt according to claim 1, wherein a total filler content is from 20 phr to 150 phr.

8. The power transmission belt according to claim 7, further comprising calcium carbonate filler.

9. The power transmission belt according to claim 1, wherein the vulcanizing agent is a peroxide.

10. The power transmission belt according to claim 1, wherein the conductive rubber mixture is devoid of conductive carbon black and has a resistivity within 10 to 15% or less as compared to a comparative rubber mixture having the same composition but with 10-15% more conductive carbon black than the graphene used in the conductive rubber mixture, and has an elongation within 10 to 15% or less as compared to the comparative rubber mixture.

11. The power transmission belt according to claim 1, wherein the load carrying section comprises reinforcement yarns.

12. A power transmission belt comprising an elastomeric body having an inner section, an outer section, and a load carrying section between the inner and outer sections, at least the inner section being formed from a conductive rubber mixture comprising:
    100 phr of ethylene-propylene-diene rubber;
    28 phr of calcium carbonate filler;
    25 phr to 60 phr of non-conductive carbon black as a filler, the non-conductive carbon black having a BET surface area of 130 $m^2/g$ or less according to ISO 977:2022;
    no conductive carbon black;
    10 phr to 50 phr of graphite;
    2 phr to 30 phr of fiber filler;
    1 phr to 3 phr of graphene as a conductive filler, the graphene having a particle size of between 100 nm to 5 μm, and a specific surface area of less than 200 $m^2/g$;
    and a peroxide vulcanizing agent;
    wherein the conductive rubber mixture has a resistivity according to ASTM D991-89(2020) in a range from 0.1 to 2 MΩ, and
    wherein the conductive rubber mixture has an elongation at break in a range from 58% to 201%.

* * * * *